Aug. 16, 1955 J. P. GITS 2,715,326
DUAL SHELL DRINKING VESSELS
Filed Oct. 14, 1950
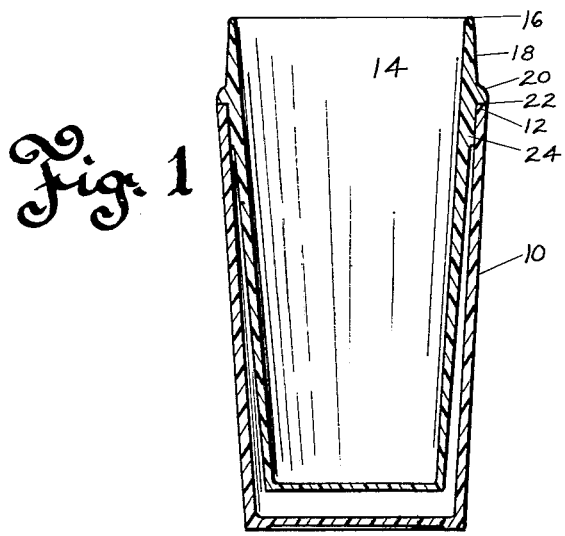
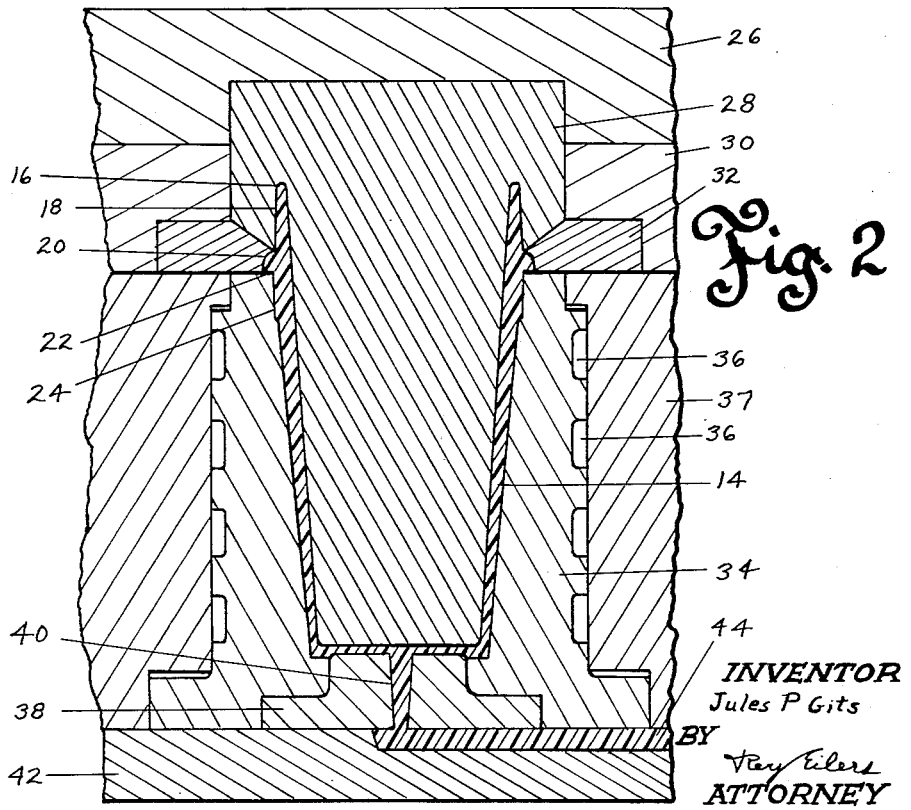
INVENTOR
Jules P Gits
BY
Percy Eilers
ATTORNEY United States Patent Office 2,715,326
Patented Aug. 16, 1955

2,715,326

DUAL SHELL DRINKING VESSELS

Jules P. Gits, Chicago, Ill., assignor of one-half to Joseph A. Gits, Chicago, Ill.

Application October 14, 1950, Serial No. 190,230

5 Claims. (Cl. 65—66)

This invention relates to improvements in containers for potables. More particularly this invention relates to improvements in dual-shell containers for potables.

It is therefore an object of the present invention to provide an improved dual-shell container for potables.

Containers for potables are customarily made from materials which are resistant to the action of the potables; and those containers are customarily made as a single shell. The shell customarily has a closed bottom, and has upstanding side walls which terminate in a lip. In some instances the containers are made of glass, in other instances the containers are made of plastic materials. The upstanding side walls are customarily made thin to make the containers light in weight, and those thin walls permit ready interchanging of heat between the air surrounding the container and contents of the container; the heat passing easily through the thin walls of the container. The ready passage of heat through the thin walls of the containers permits warm contents of the container to lose heat to the surrounding air and permits cool contents of the container to absorb heat from the surrounding air. This is often quite objectionable; and it has been proposed to use dual-shell containers to reduce the rate at which heat is transmitted through the walls of containers. The dual-shell containers will usually have a dead air space between the outer wall of the inner shell and the inner wall of the outer shell or a partial vacuum between those walls. The dead air space or the partial vacuum considerably reduces the rate at which heat can be transmitted from the interior of the containers to the surrounding air and vice versa.

Some of the dual-shell containers which have been proposed previously have been made by forming the inner and outer shells of glass, and then grinding the abutting surfaces on the two shells to provide a liquid-tight seal. The fragility of the resulting container, and the cost of making such container, makes such a container objectionable. The present invention provides a dual-shell container which is liquid-tight and yet avoids the objections experienced with prior dual-shell containers by molding smooth-surfaced inner and outer shells of a plastic material which is resilient enough to provide a liquid-tight engagement between the abutting surfaces of the two shells without any necessity of grinding those surfaces. Such a container will be highly resistant to breakage and will greatly reduce the rate at which heat is transmitted from the interior to the exterior of the shells or vice versa. It is therefore an object of the present invention to provide a dual-shell, liquid-tight container by forming smooth-surfaced inner and outer shells of plastic material which is resilient enough to permit abutting surfaces on those shells to form a liquid-tight seal.

Other dual-shell containers are made by fusing or otherwise permanently securing the upper edges of the two shells together. This is a workable way of making a dual-shell container, but it is one that usually produces a roughened lip for the container; and any such roughened lip is very objectionable. The present invention obviates any such roughening of the lip of the container by molding the upper end of the inner shell so it has a lip which is smoothly rounded, continuous, and mold-smooth. Such a lip permits even the most casual drinker to use the container without any fear of irritation or cutting of his mouth. The present invention makes this possible by molding the inner shell in such a way that the line of cleavage of the mold is wholly spaced from the lip of the inner shell. In this way, any "flash" or rough edges that may be formed where the two sections of the mold are split apart to remove the inner shell will be wholly spaced from the lip of that inner shell. It is therefore an object of the present invention to provide an inner shell of a dual-shell container wherein the parting line is wholly spaced from the lip of the inner shell.

The inner shell of the dual-shell container provided by the present invention has a frusto-conical surface immediately above and immediately below the parting line formed where the two sections of the mold are separated. These two frusto-conical sections of the inner shell are dimensioned to snugly engage the upper end of the outer shell of the dual-shell container. As the result, the inner shell of the dual-shell container can be inserted in the outer shell of that container so the inner and outer shells can telescope together to form a drinking container or can be set end to end to provide a shaker. With such a construction, the one container can perform a dual function and thus obviate the cost of a shaker. It is therefore an object of the present invention to provide an inner shell of a dual-shell container which has a frusto-conical surface above the parting line of the inner shell and also has a frusto-conical surface below that parting line, and wherein the two frusto-conical surfaces snugly engage the upper end of the outer shell of the dual-shell container.

The plastic material of which the dual-shell container provided by the present invention is made is transparent. Where this is the case, it is possible to insert small slips of paper between the walls of the two shells and to use those slips of paper as indicia of the individuals for whom the containers are intended. This avoids any risk of mixing the container intended for various persons. It is a simple matter to write down the names of the persons and to indicate the type of potables in which they are interested before the slips of paper are inserted between the walls of the two shells of the container. Thereafter, the information written on the slips of paper will be readily viewed through the walls of the outer shells. It is therefore an object of the present invention to provide dual-shell containers which are made of transparent material, so slips of paper can be disposed between the shells of the containers to indicate the names and interests of the persons using the containers.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

In the drawing, Fig. 1 is a cross sectional view through a dual-shell container that is made in accordance with the principles and teachings of the present invention, and Fig. 2 is a cross sectional view through a die where an inner shell of a dual-shell container is molded.

In Fig. 1, the numeral 10 denotes the outer shell of a dual-shell container. This outer shell 10 has a squared-off upper end which has a diameter larger than the diameter of the closed bottom of the shell 10; the shell 10 being conical in configuration. The numeral 14 denotes the inner shell of the dual-shell container provided by the present invention, and both the inner shell 14 and the outer shell 10 are preferably made of transparent plastic material. The shell 14 has a smoothly rounded, continuous, mold-smooth lip 16 at the upper end thereof. A frusto-conical surface 18 is disposed below the lip 16 and the two merge smoothly into each other. The lip 16 and the frusto-conical surface 18 below that lip constitute the areas of the container which will be contacted by the mouth of the user, and both of those areas are completely smooth. It would be well nigh impossible for a user to bruise or otherwise injure his mouth on those two surfaces, except by deliberate intent to do so. A radially projecting flange 20 is formed on the exterior of the inner shell 14 intermediate the frusto-conical surface 18 and the closed bottom of the shell 14. This radially projecting flange has a squared-off lower end and has a smoothly rounded upper end. The rounded upper end of flange 20 merges smoothly into the frusto-conical surface 18 below the lip 16. A frusto-conical surface 24 is formed on the exterior of the inner shell 14 below the flange 20, and it merges into the squared off lower end of the radially projecting flange 20. The squared-off lower end 22 of flange 20 and the frusto-conical surface 24 form an angle slightly larger than a right angle. The squared lower end 22 of flange 20 and the squared-off upper end of the outer shell 10 are dimensioned so they can fit together and make a close joint. This joint will be so close that it will normally be liquid tight.

The frusto-conical surfaces 18 and 24 are dimensioned so they can fit snugly within the open upper end of the outer shell 10. The fit between the open upper end of outer shell 10 and the frusto-conical surfaces 18 and 24 will be such that liquid tight seals will be effected between the inner shell 14 and the outer shell 10 whether the inner shell 14 is telescoped within the outer shell 10 or is placed end to end with that shell. When the inner shell 14 is telescoped within the outer shell 10, the two shells form a tumbler or container which has a dead air space or a partial vacuum between them. When the inner shell 14 and the outer shell 10 are placed end to end, the two shells form a closed container which can be used as a shaker. In either case, liquid will be kept from passing between the open upper end of the outer shell 10 and either one of the frusto-conical surfaces 18 or 24.

The fit between the open upper end of the outer shell 10 and the frusto-conical surface 24 and the fit between the squared-off lower end of the flange 20 and the squared-off upper end of the outer shell 10, is so close that air is hard pressed to pass into or out of the space between the exterior of the inner shell 14 and the interior of the external shell 10. Consequently, any air trapped in the space between the exterior of inner shell 14 and the interior of outer shell 10 will be kept in close confinement and cannot escape. This is particularly important in case the air initially trapped between the outer wall of inner shell 14 and the inner wall of outer shell 10 is initially warm and is then cooled by the contents in inner shell 14. This cooling action will tend to reduce the pressure on the air trapped between the inner and outer shells 14 and 10 as to create a partial vacuum. The tight fit between the upper end of the outer shell 10 and the frusto-conical surface 24 on the inner shell 14, and the fit between the squared-off lower end of flange 22 and the squared-off upper end 12 of outer shell 10, will be close enough to keep air from passing into the space between inner shell 14 and outer shell 10; hence the partial vacuum is preserved. This partial vacuum will additionally provide insulating effects for the contents of the inner shell 14.

Because the outer shell 10 and the inner shell 14 are made of plastics, those shells can fit tightly together and provide tight seals without being ground. This makes possible mass production of the dual-shell containers at moderate cost.

In Fig. 2, a portion of a mold which can be used to form the inner shell 14 provided by the present invention is shown. That mold or die has an upper and a lower section, and the upper section has an upper part 26, a core 28, a confining portion 30, and a projection-defining portion 32. The portions 26, 28, 30 and 32 of the upper section of the die are suitably held together by customary and usual means. The core 28 has a smoothly rounded recess which is complementary in form to the portion of the inner shell 14 which extends above the flange 20. That recess is made as accurately and as smoothly as it is possible to make dies, and thus it forms perfect, mold-smooth surfaces on the upper end of the inner shell 14. The projection-defining portion 32 of the upper section of the mold has a recess complementary to the smoothly rounded upper portions of the flange 20. The lower section of the mold or die includes a matrix 34 which has a recess therein complementary to the exterior of the inner shell 14 from the lower end of projection 22 down to the bottom of that inner shell 14. The matrix 34 coacts with the core 28 of the upper section of the mold to define the space into which the plastic material is forced in forming the outer shell 14. A number of recesses 36 are provided on the exterior of the matrix 34, and those recesses are intended to receive fluid for heating or cooling the matrix 34 to the desired temperature. The matrix 34 fits within a confining portion 37 of the lower section of the mold. A portion 38 of the lower section of the mold or die fits into a recess in the lower part of the matrix 34 of that lower section of the mold or die. A gate 40 is formed in the portion 38, and that gate communicates with a gate 44 in the bottom portion 42 of the lower section of the mold or die. The portion 38 of the lower section of the mold or die also serves the purpose of defining a recess in the bottom of the inner shell 14.

In using the mold or die shown in Fig. 2, the sections of the mold or die are initially placed in register with each other and then the fluidized plastic material is forced through the gate 44, through the gate 40 and into the space defined by core 28, projection-defining portion 32, cavity 34, and portion 38. The plastic material will be forced into this space with such pressure and force that the plastic will assume the exact curvature of the recesses formed in the core 28, the projection-defining portion 32, the matrix 34, and the portion 38. Each of these recesses will be formed as smoothly as it is possible for machinery to make them, and thus the inner shell 14 will be made precisely and will be mold-smooth.

Once the inner shell 14 has been formed, it is only necessary to separate the upper and lower sections of the mold from each other and remove the inner shell 14. The removal requires breaking of the plastic material in the gates 40 and 44, but that is easily accomplished by methods well known in the molding art. The remaining plastic material on the bottom of the inner shell 14, which was formed in the gate 40, will be suitably removed as by cutting or grinding. The rest of the plastic material in the gate 40 and the plastic material in the gate 44 will be suitably removed to ready the mold or die for the making of additional shells 14.

The outer shell 10 is not as difficult to make and it can be made by standard and customary molding procedures. Any flash which would tend to adhere to the inner shell 14 or to the outer shell 10 during the molding process or after the molded articles are removed from the molds or dies, will be located adjacent the projecting flange 20 on the inner shell 14. All such flash, and the irregularities consequent upon the formation and breaking off of such flash, are wholly spaced from the mold-smooth lip 16 on the inner shell 14. Consequently, there is no chance for the users of the containers provided by the present invention to cut their mouths or lips, or even to bruise them.

Whereas a preferred embodiment of the present invention has been shown and described in the drawing and accompanying description it should be obvious to those skilled in the art that various changes may be made in the form of the invention without affecting the scope thereof.

What I claim is:

1. A selectively separable dual-shell container which comprises a closed bottom outer shell, a closed bottom inner shell that is dimensioned so the closed bottom thereof can telescope within the closed bottom of said outer shell, a squared off upper end on said outer shell, a radially extending flange on said inner shell intermediate the top and bottom thereof, a frusto-conical surface on said inner shell above said flange, a frusto-conical surface on said inner shell below said flange, said frusto-conical surfaces being oppositely directed with the large ends thereof adjacent each other and adjacent said flange, said frusto-conical surfaces being dimensioned to selectively telescope within and snugly engage the upper end of said outer shell.

2. A selectively separable dual-shell container which comprises a closed bottom outer shell, a closed bottom inner shell that is dimensioned so the closed bottom thereof can telescope within the closed bottom of said outer shell, a squared off upper end on said outer shell, a frusto-conical interior for said outer shell, a radially extending flange intermediate the top and bottom of said inner shell, a frusto-conical surface on said inner shell above said flange, a frusto-conical surface on said inner shell below said flange, said frusto-conical surfaces having the large ends thereof adjacent each other and adjacent said flange and being dimensioned to selectively telescope within and snugly engage the upper end of said frusto-conical interior of said outer shell.

3. A selectively separable dual-shell container which comprises a closed bottom outer shell, a closed bottom inner shell that is dimensioned so the closed bottom thereof can telescope within the closed bottom of said outer shell, a squared off upper end on said outer shell, a radially extending flange on said inner shell intermediate the top and bottom thereof, a frusto-conical surface on said inner shell above said flange a frusto-conical surface on said inner shell below said flange, said frusto-conical surfaces having their large ends adjacent each other and adjacent said flange and being dimensioned to selectively telescope within and snugly engage the upper end of said outer shell, said frusto-conical surface which is on said inner shell below said projection having a diameter greater than the rest of said inner shell below said projection, and a lip on the upper end of said inner shell, the first said frusto-conical surface spacing said lip vertically above and horizontally inward of said flange.

4. A selectively separable dual-shell container that comprises a frusto-conical, outer shell which has a substantially constant wall thickness and which has a closed bottom, a closed bottom inner shell that is dimensioned so the closed bottom thereof can telescope within the closed bottom of said outer shell, a squared off upper end on said outer shell, an encircling frusto-conical surface on the exterior of said inner shell that extends outwardly from the major portion of the outer wall of said inner shell, an encircling radially extending flange on said inner shell intermediate the top and bottom thereof that has a squared off surface on the under side thereof and has a smoothly rounded surface on the upper side thereof, said flange abutting the upper end of said frusto-conical surface on said inner shell, said flange being as wide as the wall thickness of said outer shell, said frusto-conical surface on said inner shell being dimensioned to snugly engage the interior of said outer shell in face to face relation when the shells are nested adjacent said squared off end thereof, said squared off under surface of said flange engaging said squared off upper end of said outer shell, and a smoothly rounded, continuous lip on the upper end of said inner shell, said inner shell having a rounded and smooth surface intermediate said lip and said flange.

5. A selectively separable dual shell container that comprises a closed bottom outer shell, a closed bottom inner shell that is dimensioned so the closed end thereof can telescope within the closed bottom of said outer shell, a radially-extending flange on said inner shell intermediate the top and bottom thereof, a frusto-conical bearing surface on said inner shell that is adjacent but below said radially extending flange and that is dimensioned to snugly engage the interior of said outer shell, said outer shell having the upper end thereof abutting said radially extending flange whenever said inner shell is telescoped within said outer shell, a second frusto-conical surface on said inner shell that is adjacent but above said radially extending flange and that is similar to said frusto-conical bearing surface and that has its large end adjacent said radially extending flange, and a smoothly rounded lip at the upper end of said inner shell, said second frusto-conical surface being interposed between said lip and said radially extending flange.

References Cited in the file of this patent

UNITED STATES PATENTS

| Re. 22,899 | Tucker | July 15, 1947 |
|---|---|---|
| D. 38,222 | Ballentine | Sept. 4, 1906 |
| D. 132,021 | Kogan | Apr. 14, 1942 |
| 222,444 | Berry | Dec. 9, 1879 |
| 608,590 | Freund | Aug. 9, 1898 |
| 630,009 | Smalley | Aug. 1, 1899 |
| 986,865 | Russell | Mar. 14, 1911 |
| 1,199,772 | Engel | Oct. 3, 1916 |
| 1,256,427 | Bastow | Feb. 12, 1918 |
| 1,393,235 | Mitrovich | Oct. 11, 1921 |
| 1,497,159 | Porter | June 10, 1924 |
| 1,510,001 | Gunning | Sept. 30, 1924 |
| 1,519,034 | Livingston | Dec. 9, 1924 |
| 1,525,567 | Cadby | Feb. 10, 1925 |
| 1,904,845 | Zelenka | Apr. 18, 1933 |
| 1,956,395 | Montgomery | Apr. 24, 1934 |
| 2,077,216 | Conner | Apr. 13, 1937 |
| 2,169,426 | Morton | Aug. 15, 1939 |
| 2,339,221 | Gulick | Jan. 11, 1944 |
| 2,413,726 | Morrison | Jan. 7, 1947 |
| 2,435,906 | Shapiro | Feb. 10, 1948 |
| 2,526,165 | Smith | Oct. 17, 1950 |

FOREIGN PATENTS

| 792,169 | France | Oct. 14, 1935 |